Aug. 23, 1932.  W. J. BRYANT  1,872,667
WORK SIZING
Filed June 16, 1930  3 Sheets-Sheet 1
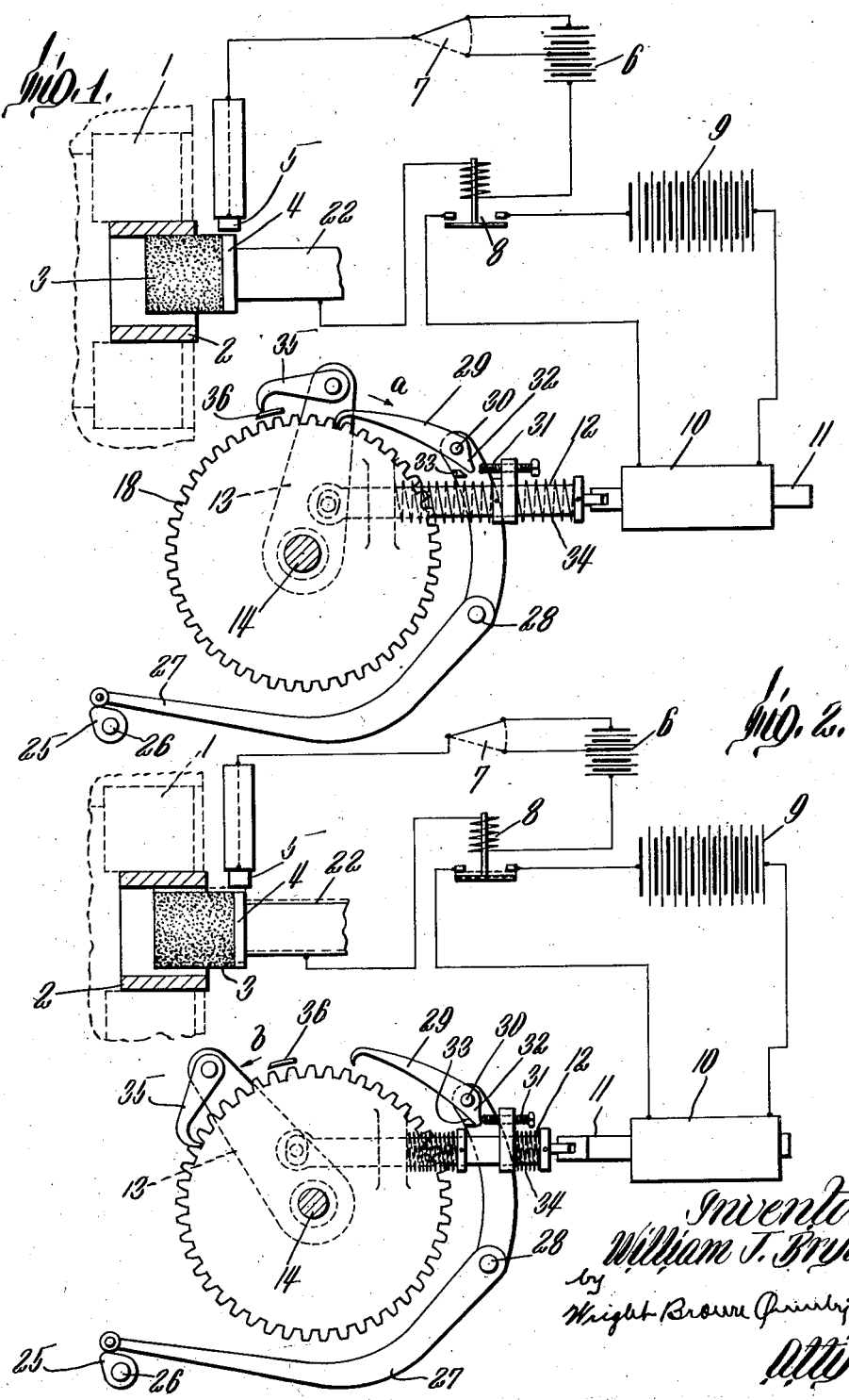

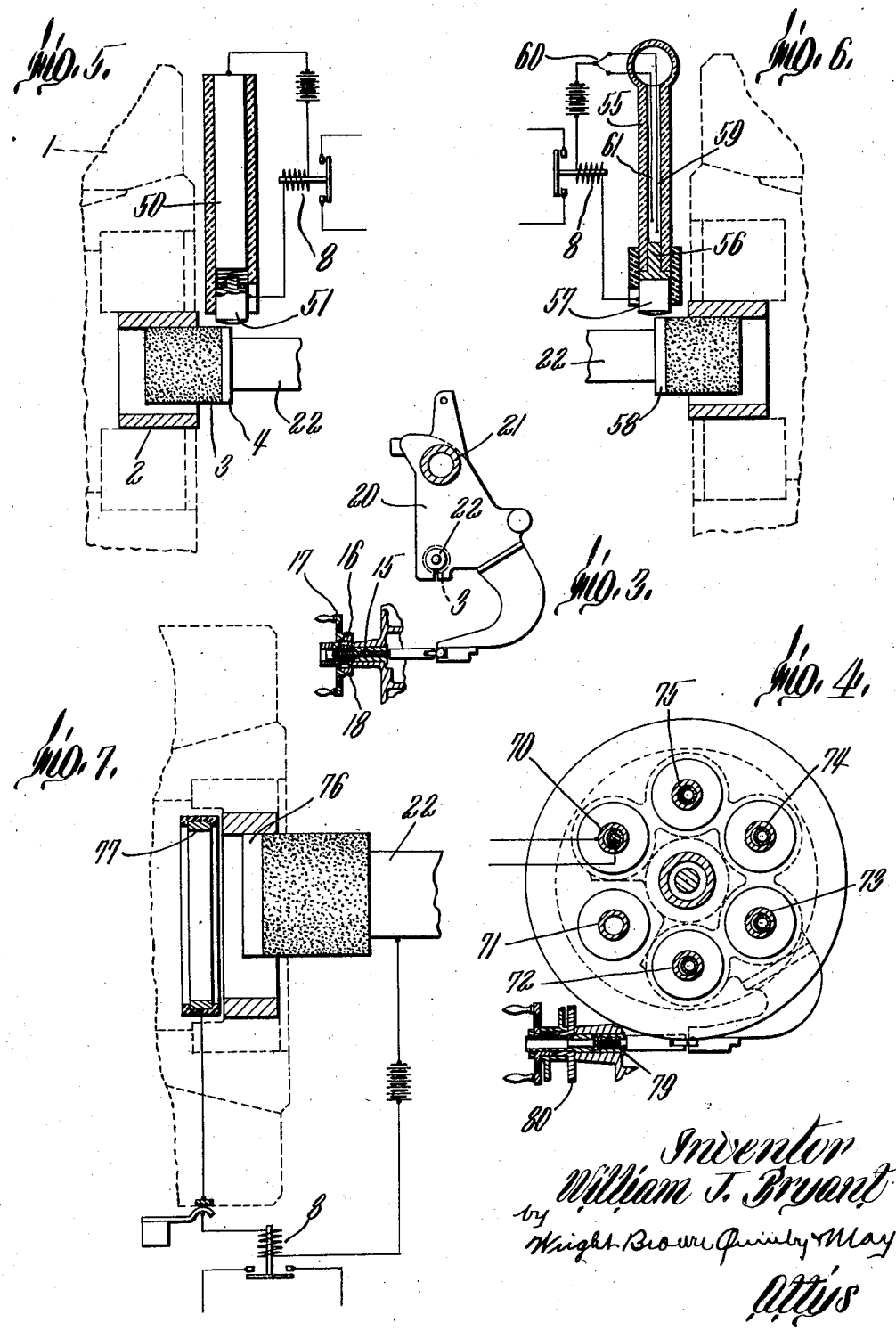

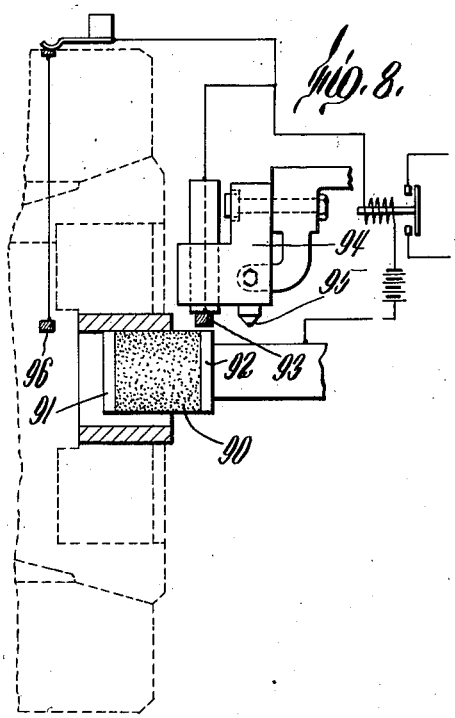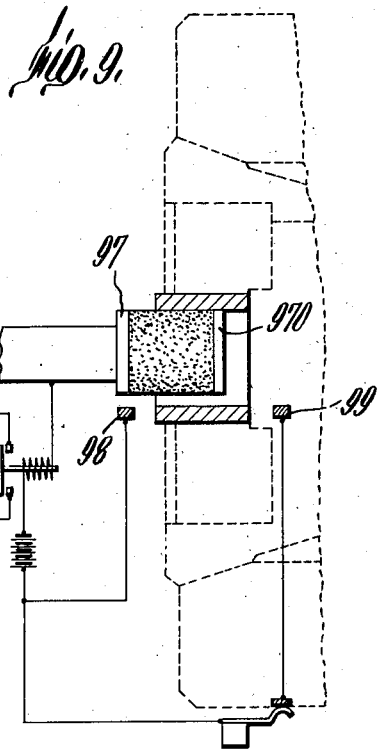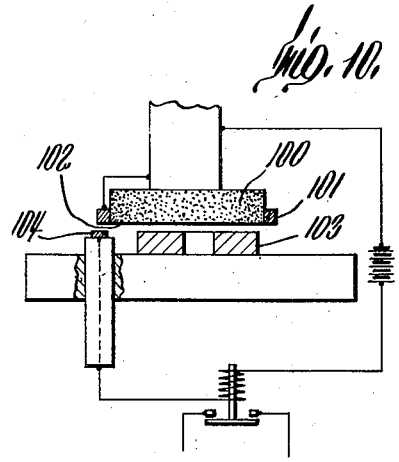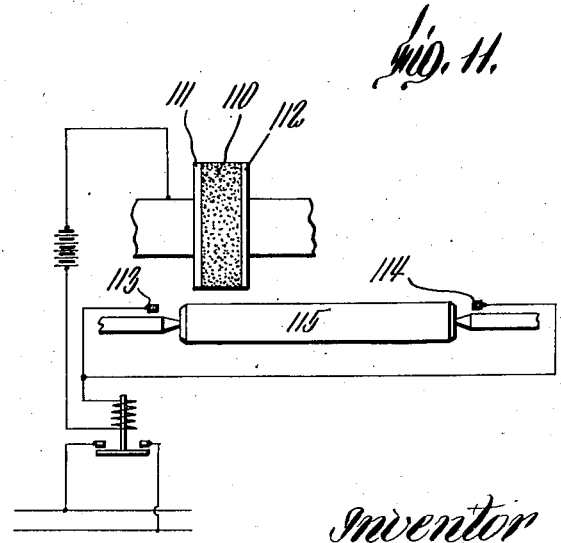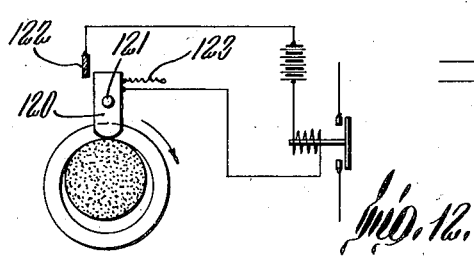

Patented Aug. 23, 1932

1,872,667

UNITED STATES PATENT OFFICE

WILLIAM J. BRYANT, OF SPRINGFIELD, VERMONT, ASSIGNOR TO BRYANT CHUCKING GRINDER COMPANY, OF SPRINGFIELD, VERMONT, A CORPORATION OF VERMONT

WORK SIZING

Application filed June 16, 1930. Serial No. 461,372.

This invention relates to methods and mechanism for accurately determining when work which is being cut reaches the desired size, and also for automatic relieving of the cutting tool from further cutting as soon as the desired size has been reached.

In accordance with the present invention the sizing indication is given not by actual measuring of the work itself, as in methods heretofore proposed, but by the position of the cutting portion of the tool when it is positioned for the final cut. This method automatically compensates for any wear of the tool, eliminates the necessity of withdrawing the tool from the work for the presentation of test gages thereto and is independent of the amount of pressure between the tool and the work.

In accordance with the present invention, when the tool cutting portion reaches a predetermined position an electric circuit is closed through suitable contacts, one of which preferably has its contact face in a definite relation to the tool face and is moved with the tool and is subjected to the same actions of wear and truing as the tool, this not only serving to give an indication that the work has reached the desired size, but it also may be employed to automatically relieve the tool from the work. By the use of different voltages impressed on the contacts, it is possible without changing the setting of the contacts to effect a preliminary withdrawal or relief of the tool slightly before finished size is reached, the higher voltage then being used, so that the tool may be trued before taking a final finishing cut, and then using the lower voltage to continue cutting the work to finished size whereupon the tool is again relieved by closing of the circuit through the same contacts.

While this invention is not limited in its broader aspects to employment with grinding wheels, nevertheless it is preeminently suitable for such service and it will therefore be more fully described with particular reference thereto.

In the accompanying drawings,

Figures 1 and 2 are diagrammatic views illustrating one embodiment of the invention as applied to internal grinding, Figure 1 illustrating the conditions before the work has been rough ground to size and Figure 2 the conditions after the preliminary or rough grinding relief has been effected, the dotted line position of the switch illustrating the same conditions respectively in Figures 1 and 2 for finish grinding.

Figures 3 and 4 are fragmentary views illustrating the relieving connection for single and multiple spindle machines, respectively.

Figures 5 to 9 inclusive are fragmentary diagrammatic views showing various modifications in connection with internal grinding.

Figures 10 and 11 are views similar to Figures 5 to 9 but illustrating certain applications of the invention to surface and external grinding respectively.

Figure 12 is a diagram illustrating a modified contact mechanism.

Referring first to Figures 1, 2 and 3, at 1 is shown in dotted lines a work holder for supporting work 2 which is shown as tubular, it being desired to grind the internal surface of this work to a definite size. As shown this is accomplished by the use of a grinding wheel 3 which forms the cutting tool and this grinding wheel is shown as provided with a ring 4 of a conducting material preferably softer than the material of the grinding wheel but arranged coaxially therewith so that it may be trued as the wheel is trued, whereby its outer face is maintained in predetermined relation to the active face of the tool. This ring 4 forms one contact member which is arranged to close an electric circuit with another contact 5 when the grinding wheel surface has reached such a point in its feed with relation to the work that it has reduced the work to a predetermined size. The contact 5 is therefore arranged so that its contact face is in predetermined relation to the face of the work being operated upon such that when this face has been brought to the desired dimension contact will be made between the elements 4 and 5 to close the circuit. As shown this circuit derives its energy from a suitable source such as a battery at 6, which is arranged so that either of two different voltages may be impressed on the circuit in accordance with the position of a switch 7. In the full line position shown in Figure 1, it is arranged to impress a certain voltage on the contacts 4 and 5, but when turned to dotted line position, it is arranged to impress a lower voltage thereon.

This electric circuit includes a relay 8 and when this circuit is closed this relay acts to close a circuit energized by a suitable source of potential 9 through a solenoid 10. This solenoid is shown as provided with a plunger 11 which is connected through a rod 12 with an arm 13 pivoted on the feed shaft 14 of the grinding machine. This feed shaft 14 may be constructed in any suitable way, as for example, as shown in Figure 3, in which it is provided with a threaded portion 15 on which is threaded a nut 16 provided with a hand wheel 17 and a gear 18. The gear 18 is arranged to be rotated by suitable ratchet mechanism in a direction to feed the wheel into the work. For example, the grinding wheel may be supported in an arm 20 carried by a rockable and axially movable shaft 21 as shown in Figure 3, this arm carrying the grinding wheel shaft 22 eccentric to the shaft 21.

The ratchet mechanism for producing the feed movements of the wheel may be actuated at suitable times as by a cam 25 on a rotary shaft 26, this cam acting on a follower arm 27 fulcrumed at 28 and carrying a dog 29 pivoted thereto on the axis 30. Under normal conditions and when the solenoid 10 is not energized each oscillation of the arm 27 will produce a movement of the dog 29 acting to turn the gear 18 in the direction of the arrow $a$. When the solenoid 10 is energized, as by closing the circuit at contacts 4 and 5 as shown by dotted lines in Figure 2, however, the core 11 is drawn thereinto, this acting to bring a contact screw 31, carried by the rod 12, into contact with the tail 32 of the dog, pressing it against a stop 33, thus to swing the dog out of operative position, as shown in Figure 2. Further motion of the member 12 against the action of a spring 34 swings the arm 13 to the left, as viewed in Figures 1 and 2, bringing the end of a dog 35 thereon off the end of a guard piece 36 which normally holds this dog 35 out of contact with the teeth of the gear 18, thus to permit this dog 35 to drop into engagement with the teeth of this gear, and pushes the gear to the left (see arrow $b$, Figure 2) into the position shown in this Figure 2, thus producing a reverse motion of the feeding means which acts to move the grinding wheel away from the work.

By employing first a higher voltage it is found possible to cause the circuit through the contacts 4 and 5 to be closed slightly before the work reaches the desired finished size, so that the tool may be retracted and the tool and the conductor 4 may be trued together. The tool may then be brought up to the work a second time, the position of the contact 5 remaining as before and the grinding continued with a lower voltage impressed on the contacts, whereupon the work may be brought to finished size before the contact circuit is closed again and the tool retracted from the work. Thus, if eight volts are impressed on the contacts, the contacts may be adjusted so that the circuit is closed and relief of the tool is effected slightly before the work has reached finished size, whereupon truing may be effected and with the same setting of the contact 5 and with six volts impressed across the contacts, the work will be reduced accurately to finished size before the circuit is again closed with the lower voltage. By using these relatively low voltages great accuracy in the timing of the closing of the circuits, and thus in the size to which the work is reduced, may be obtained. By causing one of the contacts to move with the tool and be trued with the working face of the tool, no difficulty is experienced due to varying pressure with which the tool and the work are contacted during the sizing operation, any springing of the shaft 22 being of no effect on the operation of the mechanism. It will also be noted that it is quite unnecessary to withdraw the tool from the work as is required where plug gages are employed to determine when the work has been reduced to the desired size.

In Figure 5 a modified construction is employed in which instead of causing the circuit to be closed between a contact carried by the grinding wheel and a stationary contact, the circuit is closed between a stationary contact such as at 50 and a movable contact 51 which is engaged by a non-cutting portion carried by the grinding wheel and moved into contact with the element 50 when the work has been brought to the proper size.

In Figure 6 a further modification has been shown in which in place of using two different voltages for rough and finished sizing, contact is made through a micrometer sizing device comprising a small tube 55 having a conducting liquid such as mercury at 56 pressed up into the tube 55 to a greater or less extent by a plug 57 moving in a larger diameter portion of the tube 55. The plug 57 is pressed up by its engagement with a non-cutting portion 58 carried by the grinding wheel, forcing the liquid 56 into the bore of the small tube until it makes contact with the terminal 59, closing the electric circuit through the switch 60 for rough sizing. The switch 60 is then thrown to the dotted line position so that the circuit is not again closed until the plug 57 has been pushed further and the mercury column has reached the contact 61, whereupon the tool is relieved at the final sizing.

In Figure 4 is shown the application of such a relieving mechanism to a multiple spindle grinder such as is disclosed, for example, in the patent of William L. Bryant 1,794,440, granted March 3, 1931, for multiple spindle grinding machines or the like. In this type of machine a plurality of work holders are arranged in circular series, there being one less grinding wheel than there are work holders. The work holders are indexed from one grinding position to another from an initial loading and unloading position, a portion of the grinding operation being performed by each of the grinding wheels in succession, the final sizing being produced by the last grinding wheel of the series before the work reaches the unloading position. The sizing indication, therefore, and relief of the wheel may be gaged entirely at the final grinding position as is shown at 70 in Figure 4. The loading and unloading position is shown at 71 and successive grinding positions at 72, 73, 74 and 75 prior to the final position 70. This final grinding wheel at the position 70 may, as shown in Figure 7, be provided with a conductor portion 76 which may contact with a ring contact 77 in the work holder when the work has reached finished size, thereupon to close the circuit through the relay 8 and effect the tool relieving operation as heretofore described. As shown in Figure 4 it will be seen that the several wheels are mounted on a carrier rockable coaxially with the indexing movement of the work holders by a threaded bar 79 on which may be engaged a nut portion having a feeding gear 80, as shown more particularly in the application of William L. Bryant hereinbefore referred to and quite similar to the construction illustrated in Figure 3.

In Figure 8 a further modification is shown in which the wheel 90 is provided with a pair of conductor contacts 91 and 92, the conductor contact 92 being arranged when the work reaches roughing size to close a circuit with an element 93 carried by the truing device holder 94, the diamond truing device being shown at 95. When the circuit has been closed through the contact 93 and the wheel is relieved from the work, as previously described, the wheel is withdrawn and trued, the truing device not only truing the wheel but the conductor rings 91 and 92. The truing device is then thrown out of position and the grinding is continued until the circuit is closed through the conductor ring 91 and a finish size contact 96, whereupon the wheel is again retracted from the work as previously described.

In some cases, particularly where the internal work is of considerable length, it may be desirable to provide two contact rings on the wheel, such as 97 and 970 (Figure 9) and a pair of contacts 98 and 99 set similarly so that the wheel may contact with either one or the other when the work reaches final size, thus the grinding may be stopped at either end of the traversing stroke, whereby greater accuracy may be produced than if the work came to correct size on one direction of traverse and was not retracted until it reached its other limit as where one stationary contact only is employed.

In Figure 10 the application of this principle to surface grinding is illustrated. The grinding wheel is shown at 100 and is provided with a conducting ring 101 having a face in the plane of the active face 102 of the wheel 100. The work is shown at 103 and at 104 is shown a fixed contact with its contacting face in line with the desired finished face of the work 103 so that when the wheel 100 has reduced the work to the desired size, the circuit will be closed between the contacts 101 and 104 and the tool and work relieved. Two different voltages may be employed if desired as in the showing of Figures 1 and 2 to relieve both at roughing and finished sizes.

In Figure 11 the same idea is illustrated in connection with the grinding of external work. The wheel is shown at 110 having conducting rings 111 and 112 which may contact with fixed contacts 113 and 114 positioned at opposite ends of the work 115 when this work has been reduced to the desired size thus to close the circuit through the relieving mechanism.

In Figure 12 a further modification is shown in which the grinding wheel is not provided with a conductor ring but instead contacts when the work has been reduced to the desired size with an element 120 pivoted at 121 so as to rock this element into engagement with a contact 122 thus to close an electric circuit between the elements 120 and 122 and actuate the relieving mechanism. The element 120 is normally held in circuit-open position as by means of a spring 123.

Where one of the contacts is carried by the grinding wheel or other tool, it is desirable that it be made of material of about the same hardness as or somewhat softer than the tool so that it will wear away at substantially the same rate as the tool so as not to score the work and will also be trued by the truing device in the same relation to the grinding face of the work. If this contact were harder than the wheel and tending to wear more slowly there would be a correspondingly heavier pressure between it and the work, tending to wear it more and equalize its wear on the wheel. Where the contact is softer the pressure between it and the work would be correspondingly reduced thus also tending to equalize the wear on both tool and contact. In general material for the contact of about the same hardness as the tool, or a little less, is preferable. Carbon has proved to be a suitable material for use in connection with grinding wheels.

From the foregoing description of certain embodiments of this invention, it should be evident to those skilled in the art that various changes and modifications might be made without departing from the spirit or scope of this invention as defined by the appended claims.

I claim:

1. In combination, a work holder, a tool having a cutting portion for operating on work carried by said holder, means for relatively feeding said tool and work holder, an electric circuit and an electrical contact in said circuit having a contact face in a predetermined relation to the desired size of the work, a second electrical contact in said circuit movable relative to said work holder with said tool into electrical connection with said first mentioned contact when said tool has reduced the work to the desired dimension thus to close said circuit, and means actuated by the closing of said circuit through said contacts for stopping relative feed between said tool and the work.

2. In combination, a work holder, a tool having a cutting portion for operating on work carried by said holder, means for relatively feeding said tool and work holder, an electric circuit, an electrical contact in said circuit having a contact face in a predetermined relation to the desired size of the work, a second electrical contact in said circuit movable relative to said work holder with said tool into electrical connection with said first mentioned contact when said tool has reduced the work to the desired dimensions thus to close said circuit, and means actuated by the closing of said circuit for retracting said tool from the work.

3. In combination, a work holder, a tool having a cutting portion for operating on work carried by said holder, means for relatively feeding said tool and work holder, an electrical circuit, an electrical contact in said circuit having a contact face in predetermined relation to the desired size of the work, a second electrical contact movable relative to said work holder with said tool and having a contact face in predetermined relation to the cutting portion of said tool in position to contact with said first mentioned contact face when the work has reached the desired size to close said circuit, means for selectively impressing any of a plurality of different potential differences on said contacts in said circuit, and means effective on closing of said circuit to stop the feeding action of said feeding means.

4. In combination, a work holder, a tool having a cutting portion for operating on work carried by said holder, means for relatively feeding said tool and work holder, an electrical circuit, an electrical contact in said circuit having a contact face in predetermined relation to the desired size of the work, a second electrical contact movable relative to said work holder with said tool and having a contact face in predetermined relation to the cutting portion of said tool in position to contact with said first mentioned contact face when the work has reached the desired size to close said circuit, means for selectively impressing any of a plurality of different potential differences on said contacts in said circuit, and means effective on closing of said circuit to stop the feeding action of said feeding means and to separate said tool and work.

5. In combination, means for supporting work, a grinding wheel, a conductor carried by said grinding wheel and having a face forming a continuation of the active face of said wheel, an electrical circuit, a contact in said circuit supported in predetermined relation to a face of the work to be ground when the work has been ground to a desired extent and to then cooperate with said conductor to close said circuit, and indicating means actuated by the closing of said circuit.

6. In combination, means for supporting work, a grinding wheel, a conductor carried by said grinding wheel and having a face forming a continuation of the active face of said wheel, an electrical circuit, a contact in said circuit supported in predetermined relation to a face of the work to be ground when the work has been ground to a desired extent and to then cooperate with said conductor to close said circuit, and means actuated when said circuit is closed for retracting said wheel from the work.

7. In combination, a work support, a grinding wheel having a conductor mounted coaxially with said wheel and having a face forming a continuation of the acting face of said wheel and trued therewith when said wheel face is trued, means for relatively traversing said wheel and support, a contact arranged with its contact face in line with the position of said work face in the direction of traverse when grinding of said work face has been effected to the desired extent to contact with said conductor, and an electric circuit closeable between said contact and conductor for indicating when grinding has progressed to the desired extent.

8. In combination, a work support, a grinding wheel having a conductor mounted coaxially with said wheel and having a face forming a continuation of the active face of said wheel and trued therewith when said wheel face is trued, said conductor being of material as soft as said wheel, means for relatively traversing said wheel and support, a contact arranged with its contact face in line with the position of said work face in the direction of traverse when grinding of said work face has been effected to the desired extent to contact with said conductor, and an electric circuit closable between said contact and conductor for indicating when grinding has progressed to the desired extent.

9. In combination, a work support, a grinding wheel having a conductor mounted coaxially with said wheel and having a face forming a continuation of the active face of said wheel and trued therewith when said wheel face is trued, said conductor being of material as soft as said wheel, means for relatively traversing said wheel and support, a contact arranged with its contact face in line with the position of said work face in the direction of traverse when grinding of said work face has been effected to the desired extent to contact with said conductor, an electric circuit closable between said contact and conductor for indicating when grinding has progressed to the desired extent, and means for introducing a higher or a lower voltage on said circuit.

10. The method of sizing work with a tool, which comprises associating with said tool a contact having a contact face in predetermined relation to the cutting portion of said tool and associating with said work a contact cooperating with the contact face of said tool contact to first close an electric circuit when the work is somewhat short of finished size, removing the tool from the work when said circuit is closed, truing the tool and tool contact to maintain said contact face in the same relation to the active portion of said tool as before truing, and while said work contact is positioned to close said circuit with said contact face when the work is brought to finished size continuing the operation of said tool until such circuit is again closed.

11. The method of sizing work with a tool, which comprises associating with said tool and the work cooperating contacts arranged to close an electric circuit of predetermined voltage before the work reaches the desired size, truing the tool and its contact to position them in accurate predetermined relation, and then continuing the action of said tool on the work only until said circuit is again closed through said contacts under a lower voltage.

In testimony whereof I have affixed my signature.

WILLIAM J. BRYANT.